(12) United States Patent
Alissa et al.

(10) Patent No.: US 12,305,497 B1
(45) Date of Patent: May 20, 2025

(54) IONIC LIQUIDS FOR HYDROCARBON RESERVOIR STIMULATION

(71) Applicant: SAUDI ARABIAN OIL COMPANY, Dhahran (SA)

(72) Inventors: Faisal M. Alissa, Dhahran (SA); Jehad K. Eldemellawi, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/418,544

(22) Filed: Jan. 22, 2024

(51) Int. Cl.
*E21B 43/27* (2006.01)
*C09K 8/72* (2006.01)

(52) U.S. Cl.
CPC .............. *E21B 43/27* (2020.05); *C09K 8/72* (2013.01)

(58) Field of Classification Search
CPC .......... E21B 43/27; E21B 43/13; E21B 43/16; C09K 8/72
See application file for complete search history.

(56) References Cited

U.S. PATENT DOCUMENTS

| | | | |
|---|---|---|---|
| 6,350,721 B1 | 2/2002 | Fu et al. | |
| 7,589,050 B2* | 9/2009 | Frenier | C09K 8/86 507/241 |
| 9,127,194 B2* | 9/2015 | Reyes | E21B 37/00 |
| 2002/0055439 A1* | 5/2002 | Palmer | C09K 8/536 507/200 |
| 2007/0235189 A1* | 10/2007 | Milne | C09K 8/74 507/923 |
| 2021/0179929 A1 | 6/2021 | Al-Nakhli et al. | |

FOREIGN PATENT DOCUMENTS

WO 2021016510 A1 1/2021

OTHER PUBLICATIONS

Ibrahim Gomaa, et al., Novel Approach for Sandstone Acidizing Using in Situ-Generated Hydrofluoric Acid with the Aid of Thermochemicals, ACS Omega 2020 5 (2), 1188-1197.
Rizwan Ahmed Khan, et al. Imidazolium-Based Ionic Liquids as Clay Swelling Inhibitors: Mechanism, Performance Evaluation, and Effect of Different Anions, ACS Omega 2020 5 (41), 26682-26696.
Rizwan Ahmed Khan, et al., Ionic liquids as completion fluids to mitigate formation damage, Journal of Petroleum Science and Engineering, vol. 214, 2022.
Achinta Bera, Hadi Belhaj, Ionic liquids as alternatives of surfactants in enhanced oil recovery—A state-of-the-art review, Journal of Molecular Liquids, vol. 224, Part A, 2016, pp. 177-188.

* cited by examiner

*Primary Examiner* — Silvana C Runyan
(74) *Attorney, Agent, or Firm* — Vorys, Sater, Seymour and Pease LLP

(57) ABSTRACT

Ionic liquids may be used in reservoir stimulation operations for treatment of a subterranean hydrocarbon reservoir. For example, methods of treatment may include: introducing a treatment fluid to a subterranean reservoir during a stimulation operation, wherein the treatment fluid comprises: an ionic liquid, wherein the ionic liquid comprises an organic cation and a halide-terminated anion; and dissolving a portion of the subterranean reservoir with the treatment fluid.

20 Claims, No Drawings

IONIC LIQUIDS FOR HYDROCARBON RESERVOIR STIMULATION

FIELD OF THE DISCLOSURE

The present disclosure relates generally to hydrocarbon reservoir stimulation.

BACKGROUND OF THE DISCLOSURE

Reservoir stimulation may be performed on a subterranean reservoir to achieve, increase, or restore fluid production therefrom, such as hydrocarbons including oil and gas. Reservoir stimulation operations include matrix acidizing, fracturing, and acid fracturing as non-limiting examples. The type of stimulation operation employed in a particular circumstance may depend on factors including the geology of the reservoir and the type of hydrocarbons being produced.

Reservoirs targeted for stimulation operations may include moderate- to low-permeability carbonate reservoirs (typically comprising calcite and/or dolomite) as well as sandstone reservoirs (typically comprising silicon dioxide with various minerals and clays). During matrix acidizing operations, mineral acids or organic acids are used to dissolve a portion of the reservoir matrix to form passages (wormholes) through which a hydrocarbon resource may flow. Matrix acidizing operations are conducted below the fracture gradient pressure (i.e., the pressure above which injection of fluids will cause a reservoir to fracture hydraulically) of the carbonate reservoir. Acid fracturing is conducted above the fracture gradient pressure of the carbonate reservoir to create or extend a plurality of fractures into the reservoir matrix, which may be held open by proppant particulates once the pressure is released. The acid may continue to erode the fractures or expand wormholes extending therefrom to increase production.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

A first nonlimiting example method of the present disclosure may include: introducing a treatment fluid to a subterranean reservoir during a stimulation operation, wherein the treatment fluid comprises: an ionic liquid, wherein the ionic liquid comprises an organic cation and a halide-terminated anion; and dissolving a portion of the subterranean reservoir with the treatment fluid.

A second nonlimiting example method of the present disclosure may include: introducing a treatment fluid to a subterranean reservoir during a stimulation operation, wherein the subterranean reservoir comprises a sandstone reservoir and wherein the treatment fluid comprises: an ionic liquid, wherein the ionic liquid comprises an organic cation and a fluoride-terminated anion; dissolving a portion of the subterranean reservoir with the treatment fluid during the stimulation operation; conducting flowback of the treatment fluid or a spent variant of the treatment fluid out from the subterranean reservoir; and producing hydrocarbons from the subterranean reservoir following flowback.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to hydrocarbon reservoir stimulation.

Compositions and methods of the present disclosure may provide advantages over those conventionally used in subterranean stimulation operations, including increased stimulation activity, mitigation of side reactions, and reduction of exposure to hazardous hydrofluoric acid.

Methods of the present disclosure may include introducing a treatment fluid to a subterranean reservoir during a stimulation operation, the treatment fluid comprising an ionic liquid having therein an organic cation and a halide-terminated anion, preferably comprising a fluoride-terminated anion, and subsequently dissolving a portion of the subterranean reservoir with the treatment fluid.

Reservoirs of interest in the present disclosure may include any suitable subterranean reservoir having hydrocarbons (e.g., petroleum, natural gas, the like) therein. A subterranean reservoir of the present disclosure may preferably comprise a sandstone reservoir. Sandstone reservoirs may conventionally involve costly and hazardous acid stimulation due to conventionally low solubility in treatment fluids of sand as compared to calcium carbonate or other minerals found in carbonate reservoirs. Sandstone reservoir stimulation may conventionally require use of hydrofluoric acid or fluoride-containing salts capable of generating hydrofluoric acid in-situ within the subterranean reservoir. Such chemicals may produce large quantities of undesirable gasses upon reaction with reservoir materials, including producing silicon tetrafluoride gas. Additionally, sandstone reservoir stimulation may conventionally entail significant undesirable side reactions due to the presence of clay within the sandstone reservoir and the reaction therewith of the hydrofluoric acid. The present disclosure allows for reduction of side reactions due to passivation of clay and allows for reducing undesirable gasses such as silicon tetrafluoride.

"Reservoir materials," and grammatical variations thereof, refer to any material within a subterranean reservoir, including, but not limited to, material that is intended to be targeted during a stimulation operation. Examples of reservoir materials may include, but are not limited to, sandstone, carbonate, clay, other minerals, the like, or any combination thereof.

"Clay" as used herein refers to additional minerals within a subterranean reservoir that may lead to undesired side reactions or precipitations, thus affecting the stimulation operation in question. Clays may generally comprise a minority of minerals within a subterranean reservoir, as measured by mass. Examples of clays may include, but are not limited to, smectite, illite, kaolinite, chlorite, the like, or any combination thereof.

The present disclosure may allow for reaction of treatment fluid for hydrocarbon reservoir stimulation operations.

Such a treatment fluid may include an ionic liquid therein for reaction with subterranean reservoir materials.

"Ionic liquid," and grammatical variations thereof, as used herein refer to a salt compound having an anion and a cation wherein the salt compound is liquid at standard temperature and pressure conditions (about 1 atm, about 25° C.). Ionic liquid compositions of the present disclosure may include an ionic liquid. The ionic liquid may comprise cation and anion (e.g., an organic cation and a halide-terminated anion, respectively). The cation and the anion may be present in suitable ratios to achieve desired function of the ionic liquid within the treatment fluid. A suitable molar ratio for cation to anion within the ionic liquid may include, for example, from 1:10 to 10:1, or 1:5 to 5:1, or 1:3 to 3:1, or 1:2 to 2:1, or about 1:1 (equimolar).

Organic cations of interest in the present disclosure may include any suitable positively charged ions capable of forming an ionic liquid with included halide-terminated anions. Organic cations of interest may include precursor species capable of forming ions compatible with halide-terminated anions described herein. Examples of suitable organic cations of interest may include, but are not limited to, a C1-C30 1-alkyl-3-methylimidazolium (CMIM) (e.g., 1-Butyl-3-methylimidazolium (BMIM), 1-ethyl-3-methylimidazolium (EMIM), the like), 1,3-dimethylimidazolium (MMIM), N-methylimidazole (MIM), the like, or any combination thereof.

Halide-terminated anions of interest in the present disclosure may include single-halide anions or anions having multiple halide atoms. Halides of interest for inclusion in anions of the present disclosure may include, but are not limited to, chlorine, iodine, bromine, fluorine, the like, or any combination thereof. Halide-terminated anions of the present disclosure may preferably be fluoride-terminated anions. Examples of fluoride-terminated anions may include, but are not limited to, hexafluorophosphate ($PF_6$), tetrafluoroborate ($BF_4$), the like, or any combination thereof.

Treatment fluids of the present disclosure may further include an aqueous fluid at any suitable concentration including, for example, from 1 wt % to 99 wt %, or 1 wt % to 90 wt %, or 10 wt % to 90 wt %, or 1 wt % to 50 wt %, or 1 wt % to 20 wt %, or 1 wt % to 10 wt %, or 50 wt % to 90 wt %, or 70 wt % to 90 wt %, by total weight of the treatment fluid. Any suitable aqueous fluids may be included in treatment fluids of the present disclosure so long as components of the aqueous fluid are compatible with a given treatment fluid composition (e.g., an ionic liquid therein) and with a desired stimulation operation. Suitable aqueous fluids for inclusion in the treatment fluids of the present disclosure may include, but are not limited to, fresh water (e.g., stream water, lake water, or municipal treated water), non-potable water such as gray water or industrial process water, sea water, brine, aqueous salt solutions, partially desalinated water, produced water (including brine and other salt water solutions), or any combination thereof.

In some or other embodiments, treatment fluids of the present disclosure may optionally be gelled or emulsified. Gelled treatment fluids may comprise a polymer to promote gelling, wherein the gel may comprise, for example, a linear gel, crosslinked polymer gel, the like, or any combination thereof. One of ordinary skill in the art will be able to appropriately select and implement a gelled or emulsified form of treatment fluids, given the benefit of the present disclosure.

The treatment fluids described herein may further include one or more additional components suitable for achieving one or more desired functions (e.g., in addition to the stimulation operation in question), provided that the one or more additional components do not adversely affect the function of treatment fluids described herein. Examples of suitable additional components may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, an iron control agent, the like, or any combination thereof. Suitable examples of the foregoing will be familiar to one having ordinary skill in the art.

Treatment fluids of the present disclosure may be used in various reservoir stimulation operations as suitable. The term "treatment fluid," and grammatical variants thereof, refers to any fluid that may be used in a subterranean treatment operation (also referred to simply as "treatment" or "operation" herein) in conjunction with a desired function and/or for a desired purpose. The term "treatment fluid" does not imply any particular action by the fluid or any component thereof. Suitable stimulation operations that may be promoted by a treatment fluid include, but are not limited to, for example, matrix acidizing, fracturing, acid fracturing, or any combination thereof.

Treatment fluids of the present disclosure may be formulated as a main treatment fluid for introduction to a subterranean reservoir, or the treatment fluids may be formulated as a pad fluid. As used herein, a "pad fluid" refers to a small-volume treatment fluid that contains at least some of the components present in a main treatment fluid (commonly a larger-volume of main treatment fluid) to follow the pad fluid. For example, during a fracturing operation, a pad fluid comprising all components except for proppant particulates may precede a subsequently introduced fracturing fluid containing proppant particulates. Thus, in the present disclosure, a pad fluid comprising an aqueous acid and a flowback aid comprising a blend of components specified above may precede and acid fracturing fluid comprising the aqueous acid, the flowback aid, and a plurality of proppant particulates.

In some embodiments, the treatment fluids described herein may be foamed. For example, certain treatment fluids described herein may comprise a foamed acid fracturing fluid or a foamed matrix acidizing fluid. A gas component or a foaming agent (a component that forms a gas under specified conditions) may be injected into the treatment fluid in order to form a foam, before flowing the treatment fluid into a subterranean reservoir as part of a reservoir stimulation operation. Alternately, foam formation may take place downhole. Suitable gases to promote foaming may include, but are not limited to, nitrogen ($N_2$), carbon dioxide ($CO_2$), the like, or any combination thereof. Foaming agents may generate these gases or others under the specified conditions. Introduction of the gas or foaming agent into the treatment fluid may be carried out in any suitable means known in the art. Suitable foaming agents will also be familiar to persons having ordinary skill in the art.

Once within the subterranean reservoir, treatment fluids of the present disclosure may react with materials of the subterranean reservoir in order to stimulate the reservoir and prepare for hydrocarbon extraction. As a nonlimiting example, halide-terminated anions may form acid in-situ through reaction of treatment fluids of the present disclosure. Preferably, in-situ formation of acid may include in-situ formation of hydrofluoric acid. Subsequently, in-situ generated acid may react with subterranean reservoir materials in the stimulation operation. As a further nonlimiting example, organic cations may react with clay or other materials of the subterranean reservoir so as to passivate the clay and prevent further undesirable side reactions. Undesirable side reactions may include both physical reactions and/or chemical reactions between the clay and materials of the treatment fluid. Examples of undesirable reactions with clays of a subterranean formation may include, but are not limited to, clay swelling, clay adsorption, the like, or any combination thereof.

Suitable stimulation operations that may be performed with the treatment fluids may include, for example, fracturing, acid fracturing, matrix acidizing, or any combination thereof. The treatment fluids may also be used in conjunction with scale dissolution operations as well. The treatment fluids of the present disclosure may allow for provision of one or more of the aforementioned functions simultaneously, allowing for a single stage reservoir stimulation operation to be carried out where, conventionally, multiple stages of reservoir stimulation may have been required. No special mixing or equipment requirements are believed to be needed for preparation and use of the treatment fluids described herein.

The stimulation operations may be conducted in a subterranean reservoir, preferably comprising a sandstone reservoir. Thus, during matrix acidizing and acid fracturing operations, the treatment fluids described herein may facilitate use of smaller quantities of acid or eliminate the use of acid altogether, and furthermore may allow deeper penetration into the reservoir matrix due to reduction in side reactions. The foregoing may decrease treatment and production costs, as well as afford environmental benefits. On-the-fly production of the treatment fluids may occur in some cases.

In some embodiments of the present disclosure the reservoir stimulation operation may comprise matrix acidizing. During the matrix acidizing operation, acid-soluble material in the subterranean reservoir may be dissolved by the treatment fluid. Injection as part of the matrix acidizing operation may occur while the reservoir is subjected to pressures lower than the fracture gradient pressure. After at least partial spending of the aqueous acid in the treatment fluid, the other components in the treatment fluid may then aid in the flowback of a heavy brine produced through dissolution of the reservoir matrix.

In some embodiments of the present disclosure the reservoir stimulation operation may comprise acid fracturing. Acid fracturing comprises fracturing the reservoir and dissolving acid-soluble material of the reservoir, wherein the treatment fluid is introduced at a pressure higher than the fracture gradient pressure of the reservoir in order to simultaneously fracture and dissolve portions of the reservoir using the treatment fluid. Following fracturing, the other components in the treatment fluid may then aid in the flowback of a heavy brine produced through dissolution of the reservoir matrix.

In some embodiments, the treatment fluids disclosed herein (including mixing of individual components or mixtures thereof, i.e., within the flowback aid) may be mixed at a remote location from a job site and shipped thereto or, in other embodiments, the treatment fluids may be mixed at a job site. In still other embodiments, the treatment fluid may be mixed and pumped into a subterranean reservoir on-the-fly. A person having ordinary skill in the art of designing such fluids with the benefit of this disclosure will be able to consider these factors and determine whether remote mixing, on-site mixing, or any other suitable mixing protocol is most appropriate for a given operation. The systems used for handling treatment fluids for use in stimulation operations of the present disclosure may include one or more mixing and/or storage tanks used for mixing and/or storing, respectively, treatment fluids prior to use in a stimulation operation. Additional tanks may be used for storing spent or partially spent treatment fluid removed from a subterranean reservoir as part of a stimulation operation.

Following a stimulation operation, the treatment fluids or a spent or partially spent variant thereof may be produced from the subterranean reservoir during aqueous fluid flowback. Advantageously, the fluid recovery from the subterranean reservoir may be about 50% or greater, or about 60% or greater, or about 70% or greater, or about 80% or greater after being produced from the subterranean reservoir. Production of the spent or partially spent treatment fluid may take place within 30 minutes, or within about 45 minutes, or within about 60 minutes, or within about 2 hours, or within about 6 hours, or within about 12 hours, or within about 24 hours, depending on the length of time the treatment fluid is shut in downhole to perform the stimulation operation.

Systems for introduction of treatment fluids to a wellbore in conjunction with a stimulation operation may comprise a pump fluidly coupled to a tubing, the tubing located at least partially within the wellbore and the tubing containing a treatment fluid for a desired stimulation operation. The "pump" described herein may comprise a single pump or may comprise one or more pumps which may include "high pressure" and "low pressure" pump(s) in any combination. A "high pressure" pump, i.e., a pump operating at a pressure greater than about 1000 psi, may be used in stimulation operations according to the present disclosure such as acid fracturing where fracturing of the subterranean reservoir at a pressure higher than the fracture gradient pressure is required. A "low pressure" pump, i.e., a pump operating at a pressure of about 1000 psi or less, may be used in stimulation operations such as matrix acidizing where lower pressures are needed and where fracturing of the subterranean reservoir is not required. Given the benefit of the present disclosure, one having ordinary skill in the art will be able to select an appropriate pump or combination of pumps for a given stimulation operation.

The treatment fluids of the present disclosure may be injected using the pump(s) into the subterranean reservoir using the tubing located within the wellbore. The treatment fluid used in a particular stimulation operation may flow downhole through the tubing and flow out of the tubing into the subterranean reservoir in order to carry out the stimulation operation. Subsequently, in some stimulation operations including matrix acidizing and acid fracturing, the treatment fluid of a particular stimulation operation may be flowed back to the wellhead along with residual components which may include, for example, the acid-soluble material dissolved from the reservoir matrix during an acidizing operation. The treatment fluid and residual components may flow through the tubing or the wellbore annulus and back to the wellhead.

It should be noted that additional nonlimiting components may be present in systems suitable to introduce the treatment fluids to a subterranean reservoir and to recover fluid from the subterranean reservoir following stimulation. Such additional components will be familiar to one having ordinary skill in the art and include, but are not limited to, supply hoppers, valves, condensers, adapters, joints, gauges, sensors, compressors, pressure controllers, pressure sensors, flow rate controllers, flow rate sensors, temperature sensors, the like, or any combination thereof.

It is also to be recognized that the disclosed treatment fluids may be used in combination with various downhole equipment and tools during a stimulation operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices, or components, the like, or any combination thereof.

To facilitate a better understanding of the embodiments described herein, the following examples of various representative embodiments are given. In no way should the following examples be read to limit, or to define, the scope of the present disclosure.

EXAMPLES 1.06 g silica sand acquired from a desert was combined with 0.47 g of $NH_4$—$PF_6$ in 50 mL water and stirred for 12 hours at room temperature (about 22° C.). Subsequently, the composition was added to a 0.45 µm paper filter under vacuum and 0.87 g sand remained after filtering. Thus, a calculated amount of 0.19 g sand was dissolved into solution. It can be calculated the reaction can generate 0.0144 mol $SiF_4$ and thus 0.0036 moles hydrofluoric acid (HF) based on the initial quantity of $NH_4$—$PF_6$. Based on the weight loss of silica sand, it can be calculated that 89% of generated HF reacted with the $SO_2$ of the sand.

Additional Embodiments

Embodiments disclosed herein include:

Embodiment 1. A method comprising: introducing a treatment fluid to a subterranean reservoir during a stimulation operation, wherein the treatment fluid comprises: an ionic liquid, wherein the ionic liquid comprises an organic cation and a halide-terminated anion; and dissolving a portion the subterranean reservoir with the treatment fluid.

Embodiment 2. The method of Embodiment 1, wherein the subterranean reservoir comprises a sandstone reservoir.

Embodiment 3. The method of Embodiment 2, wherein the subterranean reservoir includes a clay component.

Embodiment 4. The method of Embodiment 3, wherein the clay component is at least partially neutralized by the organic cation.

Embodiment 5. The method of any one of Embodiments 1-5, wherein the halide-terminated anion comprises hexafluorophosphate, tetrafluoroborate, or any combination thereof.

Embodiment 6. The method of any one of Embodiments 1-5, wherein the organic cation comprises a methylimidazolium compound.

Embodiment 7. The method of Embodiment 6, wherein the methylimidazolium compound comprises, 1-Butyl-3-methylimidazolium, 1-ethyl-3-methylimidazolium, 1,3-dimethylimidazolium, N-methylimidazole, or any combination thereof.

Embodiment 8. The method of any one of Embodiments 1-7, wherein the stimulation operation comprises matrix acidizing or acid fracturing.

Embodiment 9. The method of any one of Embodiments 1-8, wherein the treatment fluid further comprises 10 wt % to 90 wt % of an aqueous fluid, based on a total weight of the treatment fluid, including the aqueous fluid.

Embodiment 10. The method of any one of Embodiments 1-9, wherein the treatment fluid is emulsified or foamed.

Embodiment 11. The method of any one of Embodiments 1-10, further comprising flowing the treatment fluid or a spent variant of the treatment fluid back out from the subterranean reservoir.

Embodiment 12. The method of Embodiment 11, wherein a recovery of the treatment fluid or the spent variant of the treatment fluid from the subterranean reservoir is 50% or greater after a shut in period in the subterranean reservoir.

Embodiment 13. The method of Embodiments 11 or 12, further comprising producing hydrocarbons from the subterranean reservoir after the flowing back out.

Embodiment 14. The method of any one of Embodiments 1-13, further comprising generating hydrofluoric acid from the halide-terminated anion in-situ within the subterranean reservoir.

Embodiment 15. The method of Embodiment 14, wherein 80% or greater of the generated hydrofluoric acid reacts with material of the subterranean reservoir.

Embodiment 16. A method comprising: introducing a treatment fluid to a subterranean reservoir during a stimulation operation, wherein the subterranean reservoir comprises a sandstone reservoir and wherein the treatment fluid comprises: an ionic liquid, wherein the ionic liquid comprises an organic cation and a fluoride-terminated anion; dissolving a portion of the subterranean reservoir with the treatment fluid during the stimulation operation; conducting flowback of the treatment fluid or a spent variant of the treatment fluid out from the subterranean reservoir; and producing hydrocarbons from the subterranean reservoir following flowback.

Embodiment 17. The method of Embodiment 16, wherein the subterranean reservoir includes a clay component.

Embodiment 18. The method of Embodiments 16 or 17, wherein the fluoride-terminated anion comprises hexafluorophosphate, tetrafluoroborate, or any combination thereof.

Embodiment 19. The method of any one of Embodiments 16-18, wherein the organic cation comprises a methylimidazolium compound.

Embodiment 20. The method of Embodiment 19, wherein the methylimidazolium compound comprises, 1-Butyl-3-methylimidazolium, 1-ethyl-3-methylimidazolium, 1,3-dimethylimidazolium, N-methylimidazole, or any combination thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:
   introducing a treatment fluid to a subterranean reservoir comprising a clay component and a non-clay component during a stimulation operation, wherein the treatment fluid comprises:
   an ionic liquid, wherein the ionic liquid comprises an organic cation and a halide-terminated anion; and
   dissolving a portion of the non-clay component with the treatment fluid while passivating the clay component with the treatment fluid during the stimulation operation.

2. The method of claim 1, wherein the subterranean reservoir comprises a sandstone reservoir.

3. The method of claim 1, wherein the treatment fluid reduces or prevents clay swelling, clay adsorption, precipitation, and/or generation of silicon tetrafluoride gas.

4. The method of claim 1, wherein the clay component is at least partially neutralized by the organic cation.

5. The method of claim 1, wherein the halide-terminated anion comprises hexafluorophosphate, tetrafluoroborate, or any combination thereof.

6. The method of claim 1, wherein the organic cation comprises a methylimidazolium compound.

7. The method of claim 6, wherein the methylimidazolium compound comprises, 1-Butyl-3-methylimidazolium, 1-ethyl-3-methylimidazolium, 1,3-dimethylimidazolium, N-methylimidazole, or any combination thereof.

8. The method of claim 1, wherein the stimulation operation comprises matrix acidizing or acid fracturing.

9. The method of claim 1, wherein the treatment fluid further comprises 10 wt % to 90 wt % of an aqueous fluid, based on a total weight of the treatment fluid, including the aqueous fluid.

10. The method of claim 1, wherein the treatment fluid is emulsified or foamed.

11. The method of claim 1, further comprising flowing the treatment fluid or a spent variant of the treatment fluid back out from the subterranean reservoir.

12. The method of claim 11, wherein a recovery of the treatment fluid or the spent variant of the treatment fluid from the subterranean reservoir is 50% or greater after a shut in period in the subterranean reservoir.

13. The method of claim 11, further comprising producing hydrocarbons from the subterranean reservoir after the flowing back out.

14. The method of claim 1, further comprising generating hydrofluoric acid from the halide-terminated anion in-situ within the subterranean reservoir.

15. The method of claim 14, wherein 80% or greater of the generated hydrofluoric acid reacts with material of the subterranean reservoir.

16. A method comprising:
   introducing a treatment fluid to a subterranean reservoir during a stimulation operation, wherein the subterranean reservoir comprises a sandstone reservoir comprising a clay component and a non-clay component and wherein the treatment fluid comprises:
   an ionic liquid, wherein the ionic liquid comprises an organic cation and a fluoride-terminated anion;
   dissolving a portion of the non-clay component with the treatment fluid while passivating the clay component with the treatment fluid during the stimulation operation;
   conducting flowback of the treatment fluid or a spent variant of the treatment fluid out from the subterranean reservoir; and
   producing hydrocarbons from the subterranean reservoir following flowback.

17. The method of claim 16, wherein the treatment fluid reduces or prevents clay swelling, clay adsorption, precipitation, and/or generation of silicon tetrafluoride gas.

18. The method of claim 16, wherein the fluoride-terminated anion comprises hexafluorophosphate, tetrafluoroborate, or any combination thereof.

19. The method of claim 16, wherein the organic cation comprises a methylimidazolium compound.

20. The method of claim 19, wherein the methylimidazolium compound comprises, 1-Butyl-3-methylimidazolium, 1-ethyl-3-methylimidazolium, 1,3-dimethylimidazolium, N-methylimidazole, or any combination thereof.

* * * * *